Aug. 7, 1956  D. D. MacLAREN ET AL  2,758,063
METHOD OF REGENERATING HYDROFORMING CATALYSTS
Filed Oct. 1, 1951
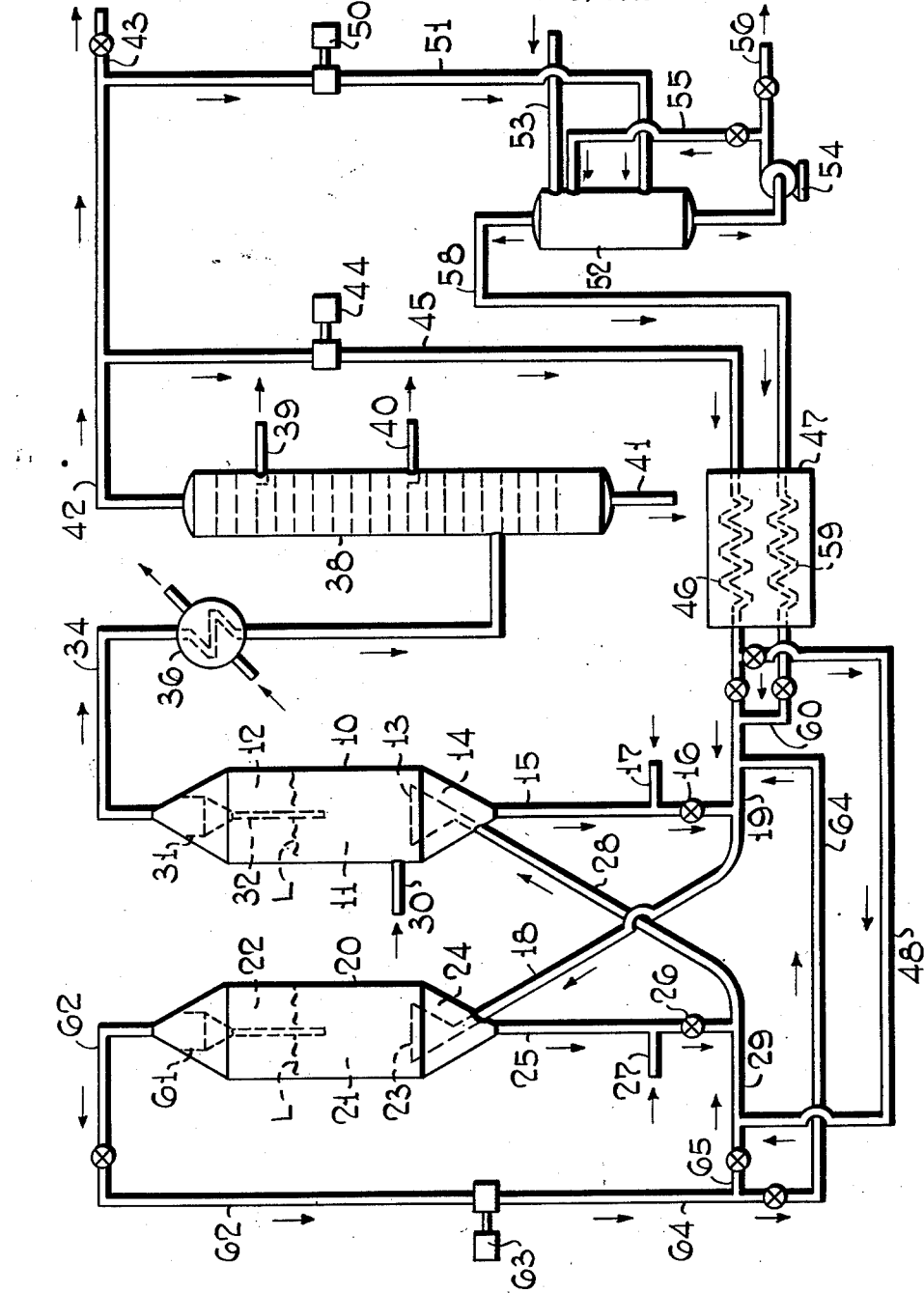
Donald D. MacLaren
Otto Schricker, Jr. Inventors
By J. Cashman Attorney

United States Patent Office 2,758,063
Patented Aug. 7, 1956

2,758,063

METHOD OF REGENERATING HYDROFORMING CATALYSTS

Donald D. MacLaren, Scotch Plains, and Otto Schricker, Jr., Roselle, N. J., assignors to Esso Research and Engineering Company, a corporation of Delaware Application October 1, 1951, Serial No. 249,176

5 Claims. (Cl. 196—50)

This invention relates to a process for hydroforming hydrocarbon fractions in contact with platinum-containing catalysts and more particularly to the reactivation or regeneration of such platinum-containing hydroforming catalysts by means of hydrogen-containing recycle or process gas.

Hydroforming is a well known and widely used process for treating hydrocarbon fractions boiling within the motor fuel or naphtha boiling range to upgrade the same or increase the aromaticity and improve the anti-knock characteristics of such fractions. By hydroforming is ordinarily meant an operation conducted at elevated temperatures and pressures in the presence of solid catalyst particles and hydrogen whereby the hydrocarbon fraction is increased in aromaticity and in which operation there is no net consumption of hydrogen. Hydroforming operations are usually carried out in the presence of hydrogen at temperatures of 750°–1150° F., in the pressure range of 50 to 3000 pounds per square inch and in contact with such catalysts as molybdenum oxide or chromium oxide, or, in general, oxides and sulfides of metals of groups IV, V, VI, VII and VIII of the periodic system of elements alone, or generally supported on a base or spacing agent such as alumina gel, precipitated alumina or zinc aluminate spinel.

It has also been proposed to reform naphtha or gasoline fractions by subjecting them to the action of certain platinum- or palladium-containing catalysts at temperatures of about 500° to 950° F. and at pressures of from about atmospheric to about 1000 pounds per square inch at hourly liquid space velocities of from about 0.1 to about 5.0 (volumes of liquid feed per volume of catalyst per hour) in the presence of from about 0.5 to about 10 mols of hydrogen per mol of feed. Catalysts suggested for this purpose comprise about 0.2 to about 2.0 weight per cent of platinum or palladium upon commercial alumina or upon a dry cracking catalyst such as silica-alumina, silica-magnesia or the like. Another catalyst of this type is prepared by precipitating alumina from aluminum chloride, commingling about 0.1 to 3.0 weight per cent of hydrogen fluoride therewith, adding hydrogen sulfide to a chloroplatinic acid solution, commingling the resultant solution with the fluoride-containing alumina, drying and heating the resultant composite.

When hydroforming hydrocarbon fractions boiling within the naphtha or motor fuel boiling range using platinum-containing catalysts at pressures above about 500 pounds per square inch the process is essentially non-regenerative. However, due to the high pressure, the octane number of the reformed product obtained is limited because of the amount of hydrocracking that occurs which reduces considerably the 10 pound R. V. P. (Reid vapor pressure), gasoline yield as severity is increased.

Recently it has been found that improved results may be obtained in hydroforming processes using platinum-containing catalysts if the pressures during hydroforming are maintained below about 500 pounds per square inch, preferably at about 50 to 250 pounds per square inch. Under these conditions higher yields of higher octane number products of satisfactory volatility are obtained. However at the lower preferred pressures there is deposition of coke or carbonaceous material on the catalyst which lowers the activity of the catalyst. This coke or carbonaceous material must therefore be substantially removed to restore or maintain the activity of the catalyst at the desired level.

It has been proposed to regenerate or reactivate platinum- or palladium-containing catalysts by treating the same with a hydrogen-rich gas to remove the carbonaceous deposits which deactivate the catalyst. In order to effect this removal of carbonaceous deposits in an economically sound or practical manner it is necessary to utilize recycle gas formed in the hydroforming process. It has been found, however, that the hydrogen-rich recycle gas from the hydroforming operation is not entirely satisfactory for the regeneration or reactivation of platinum- or palladium-containing hydroforming catalysts that have been deactivated by carbonaceous deposits formed during the hydroforming of naphtha fractions at pressures below 500 pounds per square inch.

It is the object of this invention to provide the art with an improved method for regenerating platinum- and/or palladium-containing hydroforming catalysts.

It is also the object of this invention to provide the art with an improved method for regenerating platinum- and/or palladium-containing hydroforming catalysts using recycle gas formed in the process as the regenerating agent.

These and other objects will appear more clearly from the detailed specification and claims which follow.

It has now been found that platinum- and/or palladium-containing catalysts that have been used in hydroforming naphtha fractions at pressures below 500 pounds per square inch, preferably about 50–250 pounds per square inch can be effectively regenerated with recycle gas formed in the process if said recycle gas contains about 90% or more of hydrogen and is substantially free of hydrocarbons in the $C_4$ and higher range. Specifically, it has been found that there is normally 1½ to 2 volume per cent of $C_4+$ in the recycle gas stream and that these small amounts of higher hydrocarbons have a deleterious effect upon the regeneration of platinum- or palladium-containing catalysts and that accordingly it is necessary to keep the concentration of these higher hydrocarbons below 1 volume per cent and preferably below about 0.5 volume per cent in the recycle gas used for regeneration of these platinum- and/or palladium-containing catalysts. Control of the quantity of $C_4+$ hydrocarbons in the recycle gas stream may be effected either by careful control of the separation of recycle gas from the hydroformate products or by scrubbing the recycle gas stream with a suitable absorber oil prior to passage to the regeneration operation.

In one form of the invention the platinum-containing catalyst with coke or carbonaceous material deposited thereon after a period of hydroforming is withdrawn as a dense fluidized mixture from the reactor and passed to a reactivation stage where it is treated at substantially hydroforming pressure and hydroforming temperature or higher temperature with a recycle gas from the hydroforming operation but treated to limit the amount of $C_4$ and higher hydrocarbons to less than 1 volume per cent. The hydroforming step, the recycle gas purifying step and the reactivation step are carried out continuously so that a continuous hydroforming operation results.

In another form of operation only a single fixed bed or fluidized bed of catalyst is used with intermittent reactivation of the catalyst with recycle gas that has been substantially freed of $C_4+$ hydrocarbons. In this operation, the hydroforming step, where naphtha fraction and hydrogen-rich gas are passed over the catalyst is continued for some time at a pressure below about 250 pounds per square inch until the deposition of coke or carbonaceous material on the catalyst particles impairs the activity of the catalyst whereupon the naphtha feed is cut off and a stream of hydrogen-rich recycle gas containing less than 1 volume per cent of $C_4$ and higher hydrocarbons is passed through the catalyst bed in the absence of the hydrocarbon feed in order to reactivate the catalyst. After a short period on reactivation cycle, naphtha is again introduced and passed in admixture with hydrogen-rich recycle gas over the reactivated catalyst with alternate reaction and reactivation being carried out as frequently as appears necessary to maintain the activity of the catalyst.

In another form of this invention or as a variant of the operation described immediately above, three or more fixed beds or fluidized beds of catalyst using periodic reactivation with a stream of hydrogen-rich recycle gas containing less than 1 volume per cent of $C_4$ and higher hydrocarbons can be manifolded together so as to permit cyclic operation with continuous feed of naphtha to the reactor system. Where the amount of time for reactivation exceeds the amount of time on stream by a factor of 2, 3 or more, the number of reactor or catalyst zones or vessels undergoing reactivation at a given time will exceed the number of reactors or vessels on stream by a corresponding factor of 2, 3 or more. Where two or more vessels are undergoing either reactivation or hydroforming operations at a given time such vessels may be manifolded together in series or in parallel as may be desired. A series connection of vessels in such an operation may offer certain advantages. For example, such an arrangement may make it possible to reheat the reaction gases entering each vessel as may be desired to supply the heat for any endothermic reactions involved in the hydroforming and/or reactivation reactions.

In low pressure hydroforming operations at about 50–250 pounds per square inch in contact with platinum- and/or palladium-containing catalysts it may be said that the rate at which the coke forming reaction takes place exceeds the rate at which the hydrogenation reaction which tends to remove the coke or carbonaceous deposits proceeds. Under these conditions the carbonaceous deposit initially laid down on the catalyst is subjected to further dehydrogenation and the time interval that the catalyst is on stream becomes an important factor in determining the character of the coke or carbonaceous deposit formed on the catalyst particles. Experiments have shown that after what might be regarded as a relatively short period on stream, such as 40 hours, the coke deposit, which is easily removable by hydrogenation after a period of not more than a few hours on stream, becomes so changed in character that it is practically impossible to remove it by hydrogen treatment even though much more severe conditions of temperature and hydrogen partial pressure are employed in the effort. It appears therefore, that the coke laid down after a short period on stream becomes progressively further dehydrogenated approaching the composition and character of graphite or hard coke. It is, therefore, important to limit the time that platinum- and/or palladium-containing catalysts are kept on stream in hydroforming operations in order to avoid changing the character of the coke deposit by unnecessary heat soaking into a form which is not readily removed by hydrogen treatment. The exact time interval to which the on-stream period should be limited to avoid this undesirable result will vary somewhat with the severity of the hydroforming operation, being shorter under conditions where the rate of coke deposition per unit weight of catalyst is high. In general, it is advisable to use an on-stream period of not over 12 hours and preferably of not more than 3 hours in length.

The feed stock for the hydroforming operation in accordance with the present invention is preferably a virgin naphtha but may be light or heavy naphthas, straight run naphthas, cracked naphthas or mixtures of two or more of the preceding feeds or selected naphtha fractions or mixtures thereof.

The hydroforming of these feed stocks is effected at temperatures of about 800° F. to about 975° F., preferably at 875°–900° F. and at pressures below 500 pounds per square inch, preferably at about 50 to 250 pounds per square inch. Hydrogen-rich gas is passed through the reaction zone along with the feed during the hydroforming process. Ordinarily from about 2000 to 10,000 cubic feet of hydrogen-rich gas should be passed through the reaction zone per barrel of naphtha feed or at a hydrogen to hydrocarbon mol ratio of 4/1 to 6/1. The hydrogen-rich gas is preferably recycle gas or gas formed in the hydroforming process. It may be the same as the recycle gas used in the reactivation step although it is not essential to keep the $C_4$ and higher hydrocarbon content of the recycle gas supplied to the reaction zone to below 1 volume per cent. The feed rate through the reaction zone should be in the range of from 0.2 to 5 volumes of liquid feed per volume of catalyst per hour.

The catalysts used in the process in accordance with the present invention comprise platinum or palladium dispersed upon a suitable support or spacing agent such as alumina preferably activated alumina or upon silica-alumina cogels or other inorganic metal oxide supports. The catalyst used in this process may be a platinum-containing catalyst prepared according to the method disclosed in an application Serial Number 202,130 filed December 21, 1950, by Erving Arundale et al. and reference is here made to that application for complete details not included herein. A brief description of two methods of making the catalyst will now be given but it is to be understood that the present process of regenerating or reactivating the platinum-containing catalyst with recycle gas substantially free from $C_4$ and higher hydrocarbons is not limited to this exact catalyst but may be used for regenerating other catalysts containing platinum and made by other methods.

*Example 1*

About 600 grams of 8–14 mesh F–10 Alorco activated alumina were pulverized so that about 80% of the material passed a Number 60 (U. S.) sieve, and the pulverized alumina was dried at a temperature of about 250° F. overnight or for about 16 hours. The entire batch of dried alumina was then thoroughly mixed at room temperature with an aqueous solution of hydrogen fluoride (prepared by adding 12 grams of 48% aqueous hydrofluoric acid to 400 cc. of distilled water) to form a paste. The entire batch of alumina and all of the HF solution were mixed together at once. The HF solution was substantially completely absorbed by the alumina and the resulting mixture was thoroughly mixed for about ½ hour at room temperature. By paste, wherever mentioned herein, we mean a mixture of such consistency that only about 2–8% liquid of the total volume rises as a supernatant layer after standing for about 15 minutes to one-half hour. The paste was permitted to stand at room temperature overnight or for about 16 hours to provide time for reaction between the alumina base and the hydrogen fluoride. This step is of considerable importance. The paste was then dried overnight or for about 16 hours at a temperature of about 250° F. The amount of HF used was about 1% by weight of the alumina.

The dried paste was broken up into a powder and then 75 grams of a 10% aqueous solution of chloroplatinic acid, plus about 400 cc. of distilled water were added to the hydrogen fluoride treated alumina particles at room temperature and the entire batch was mixed for about 15 minutes until the alumina substantially completely absorbed the solution of chloroplatinic acid. In this way the solution of platinum compound impregnates the alumina particles and a very homogeneous distribution of the platinum compound on the alumina particles is obtained. The amount of platinum on the HF treated alumina was 0.5% by weight of the alumina. It is considered undesirable to add excessive water to the catalyst preparation in the two impregnating steps above described.

The paste of HF-treated alumina base impregnated with the platinum compound was mixed and during mixing was treated with hydrogen sulfide gas by bubbling the hydrogen sulfide gas through the paste for about 1½ hours at a moderate rate to deposit or precipitate the platinum in situ on the alumina particles. The sulfided pasty mixture was then allowed to stand for about 4 hours at room temperature and was then put in a cold drying oven. The temperature of the oven was then raised and the paste was dried overnight or about 16 hours at about 250° F.

The dried sulfided mixture was then broken up into a powder which was pilled without a binder into cylindrical pills having a size of about 3/16 inch by 3/16 inch. The pills were calcined at about 950° F. for about two hours. After calcining, the pills at about room temperature were treated or reduced with hydrogen as the catalyst was slowly brought up to 900° F. overnight or about 16 hours at atmospheric pressure, that is, the temperature was raised 75° to 125° F. per hour. The amount of hydrogen passed over the catalyst was about 100 volumes of hydrogen per volume of catalyst per hour with at least half the treatment or about 8 hours occurring at 800°–900° F.

*Example II*

600 grams of 4–8 mesh H–41 Alorco activated alumina were pulverized and the pulverized alumina was dried at a temperature of about 250° F. overnight or for about 16 hours. The entire batch of dried alumina was then thoroughly mixed at room temperature with an aqueous solution of hydrogen fluoride (prepared by adding 6 grams of 48% aqueous hydrofluoric acid to 500 cc. of distilled water) to form a paste. The paste was mixed, then allowed to stand at room temperature and dried as in Example I. The dried paste was broken up into a powder and 75 grams of an aqueous 10% solution of chloroplatinic acid plus about 500 cc. of distilled water were added to the HF treated alumina particles at room temperature mixed for about 15 minutes until the alumina substantially completely absorbed the chloroplatinic acid solution. The catalyst was then finished in the same manner given in Example I. The catalyst contained 0.5% by weight of platinum and 0.5% by weight of HF.

The above examples give specific details for the production of platinum-containing catalysts which may be used in accordance with the present invention and while certain of the steps are essential for producing catalysts of improved activity, such as drying the alumina, contacting the dried alumina with HF and allowing to stand, drying the HF treated alumina, adding the platinum solution to form a paste, treating the paste with $H_2S$, drying, calcining and reducing; certain of the conditions may be varied and need not be exactly restricted to those given in the examples. For example, drying of the ground activated alumina may be at 212° F. to 950° F. for 2 to 24 hours, the shorter times being used at the higher temperatures. The mixing of the aqueous HF solution and dried, ground activated alumina may be continued for about ten minutes to about one hour, while adding water, if necessary, to maintain a pasty condition of the mixture but excessive water addition is to be avoided. The paste may be allowed to stand at room temperature from about 2 hours to 24 hours to allow time for the reaction between the hydrogen fluoride and alumina base. The paste may then be slowly dried at a temperature of about 212° F. to 400° F. for about 8 hours to 24 hours, the shorter times applying to the higher temperatures. After the addition of the chloroplatinic acid solution to the HF treated and dried alumina to form a paste, the mixing may continue for 5 minutes to one hour at room temperature.

The HF treated alumina containing the platinum compound is then treated at room temperature with $H_2S$ by bubbling the $H_2S$ gas through the paste while mixing for about ten minutes to three hours.

This hydrogen sulfide treatment may be carried out, if desired, under superatmospheric pressures. This permits the use of shorter treating times. As another alternative the HF treated activated alumina may be put under subatmospheric pressure to degas the alumina by evacuation and then treated with the platinum-containing solution to obtain improved impregnation of the alumina with the platinum. After stopping the addition of $H_2S$ gas, the mixture may be allowed to stand 8 hours to 24 hours at room temperature. The sulfided mixture may then be dried at about 212° F. to 400° F. for about 2 hours to 24 hours, the shorter times being employed at the higher temperatures. The catalyst, in pilled or powdered form, may be calcined at 800° F. to 1000° F. for about 1 hour to 8 hours, and then reduced with hydrogen by passing 2000 v./v./hr. (volume of hydrogen per volume of catalyst per hour) to 12,000 v./v./hr. of hydrogen at about 700° F. to 1000° F. for about 2 hours to 12 hours. In this hydrogen treatment the treated alumina pills are slowly raised to the final temperature, as above described, preferably starting at room temperature.

For preparing catalysts containing larger amounts of platinum, larger amounts of chloroplatinic acid are used and for catalysts containing more or less fluorine different amounts of HF may be used. Gaseous HF may be used but aqueous solutions of HF are preferred. Instead of using fluorine compounds other halogens such as hydrochloric acid may be used but the fluorine containing substances are preferred.

The amount of platinum in the finished catalyst is preferably between about 0.1% and 1.0% by weight but in some cases may be as high as 2.0%. The amount of HF used may vary from about .25% to 3% by weight of the catalyst with about 0.5% to 1% HF preferred. The H–41 aluminas will generally require smaller HF treats than the F–10 aluminas to produce equivalent results. For example, catalysts prepared from H–41 alumina possess optimum activity when containing about 0.5% HF, whereas those prepared from the pure aluminas (e. g. F–10) possess optimum activity when containing about 1% HF. In general, the use of higher amounts of HF, for the same set of operating conditions, will result in a more active catalyst giving more volatile gasolines (higher Reid vapor pressure) but lower octane number products so that HF treats in the range above given are to be preferred.

In the drawing the figure represents diagrammatically one form of apparatus adapted to carry out the process of the present invention in which separate hydroforming and reactivation zones are used with catalyst in finely divided, fluidized form being continuously circulated between the two zones.

Referring now to the drawing, the reference character 10 designates a vertically arranged cylindrical hydroforming reaction vessel having a dense fluidized bed of catalyst 11 in its lower portion. The dense bed of catalyst is obtained by controlling the superficial velocity of the hydrocarbon vapors and the hydrogen-rich recycle gas through the reactor vessel to about 0.2 to about 1.0 feet per second. Catalyst flows from the dense fluidized bed 11 through inverted conical section 14 at the bottom of vessel 10 into standpipe 15 provided with a control valve 16 at its lower end for controlling the amount of catalyst withdrawn from the fluidized bed 11. If necessary, fluidizing or aerating gas may be introduced at one or more points into the standpipe 15 as at 17. The aerating gas may be any inert gas but is preferably a hydrogen-containing gas such as recycle gas formed in the process.

The catalyst is discharged from the base of standpipe 15 into transfer line 18 where it is picked up by a stream of reactivation gas supplied through line 19 and conveyed into a vertically arranged cylindrical reactivation vessel 20. A dense fluidized bed 21 of catalyst undergoing reactivation is maintained in the lower portion of reactivation vessel 20. Catalyst flows from the dense, fluidized bed 21, through inverted conical section 24 at the bottom of reactivation vessel 20 into standpipe 25 provided with a control valve 26 at its lower end for controlling the amount of catalyst withdrawn from the dense, fluidized bed 21. If necessary, fluidizing or aerating gas may be introduced at one or more points into standpipe 25 as at 27.

The reactivated catalyst particles are discharged from the base of standpipe 25 into transfer line 28 where they are picked up by a stream of hydrogen-rich recycle gas supplied through line 29 and conveyed back into hydroforming reaction vessel 10.

The dense fluidized bed 11 forms the hydroforming section and the dense fluidized bed 21 forms the hydrogen reactivation or regeneration section of the reaction system. The catalyst beds are maintained in a dense fluidized condition by hydrogen-containing gas introduced into the lower portion of vessel 10 through line 28 and passing upwardly through the distribution grid or perforated member 13 into the fluidized bed 11 of catalyst and by hydrogen-containing gas introduced into the lower portion of reactivation vessel 20 through transfer line 18 and passing upwardly through distribution grid 23 into the lower portion of dense bed 21. The hydrogen-rich recycle gas is passed through the respective zones at such a velocity to form a dense, fluidized bed having a level indicated at L with a less dense phase 12 above dense bed 11 containing suspended catalyst particles therein and a less dense phase 22 above dense bed 21. When hydroforming with a powdered alumina platinum-containing catalyst made as above described or by other methods and having a particle size between about 200 or 400 mesh or finer and containing particles mostly of the size between about 0 and 80 microns, the superficial velocity of the hydrogen-containing gas passing up through catalyst bed 21 is between about 0.2 feet per second and 1.0 feet per second and the dense bed 21 will have a density of between about 20 pounds per cubic foot and 40 pounds per cubic foot.

The hydrocarbon feed which may be a naphtha or other selected hydrocarbon fraction is passed through a furnace or other suitable preheating means (not shown) to raise the temperature of the hydrocarbon feed to about 900° F. to 1050° F. The vaporized feed is then passed through supply line 30 to a nozzle or distributor arranged either in the inlet cone below distribution grid or perforated member 13 or just above the distribution grid and thence into the dense fluidized bed 11. The hydrogen-containing recycle gas with the entrained reactivated catalyst is mixed with the heated hydrocarbon feed and this mixture passes upwardly through the dense fluidized bed 11. The superficial velocity of the gases and vapors passing upwardly through the dense fluidized bed of catalyst 11 is between about 0.2 foot per second and 1.0 foot per second to maintain the catalyst particles as a dense fluidized bed 11 having a level L with a dilute phase or dilute suspension 12 of catalyst in gases or vapors above the level L. The density of the dilute suspension in phase 12 is between about .001 pound per cubic foot and .02 pound per cubic foot. The density of the fluidized bed 11 is between about 20 pounds per cubic foot and 40 pounds per cubic foot.

The catalyst to oil ratio of the mixture introduced to the hydroforming section 11 is between about 0.1 and 15 parts by weight. With the catalyst described herein the space velocity designated as w./hr./w. (pounds of oil per hour per pound of catalyst) varies from about 0.2 to 5.0, depending on the feed stocks and severity of reforming desired. The pressure during hydroforming is below 500 pounds per square inch and generally is between about 50 pounds and 250 pounds per square inch, preferably about 200 pounds per square inch and the temperature is about 800°–975° F., preferably 900° F.

Returning now to the hydroforming vessel 10, vaporous and gaseous products leave the dense fluidized bed 11 and pass into dilute phase 12 containing only a small amount of suspended catalyst and gasiform products are then passed through gas-solids separating means such as one or more cyclone separators 31 for removing most of the entrained catalyst particles. The separated catalyst particles are returned to the fluidized bed 11 through dip pipe 32 extending below the level L. The vaporous and gaseous product substantially free of catalyst particles is then passed overhead through line 34 and cooler or condenser 36 to cool the products to about 50° to 120° F. to condense normally liquid constituents.

The cooled products are then passed to fractionator 38 for separating gas from liquid hydroformed products. The liquid products may be separated into several fractions such as a light naphtha withdrawn through line 39, a heavy naphtha removed through line 40 and a heavy condensate fraction consisting of products higher boiling than gasoline withdrawn through line 41 and these higher boiling products will contain a small amount of entrained catalyst particles. The higher boiling fraction containing the catalyst may be recycled to line 30 and passed through the hydroforming step again or the higher boiling fraction may be filtered to recover the catalyst and the liquids recovered as such or passed to a catalytic cracking or thermal cracking unit.

The gas passes overhead from fractionator 38 through line 42 and contains about 80 to 95% hydrogen by volume. A portion of this gas is compressed by compressor 44 and may be passed directly through line 45 through heating coil 46 in furnace 47 and thence via line 48 to line 29 for recycling to the dense fluidized bed of catalyst 11 in the reforming reaction vessel 10. The hydrogen-containing gas is passed through heating coil 46 in furnace 47 in order to heat the gas to the hydroforming temperature and preferably somewhat higher, i. e. to about 1200° F. in order that it may supply a major portion of the heat required in the endothermic hydroforming reaction step.

A portion of the gas removed overhead from fractionator 38 may be discharged from the system through line 43 or passed to suitable storage equipment in order to prevent the accumulation of excessive amounts of recycle gas in the system.

A further portion of the gas removed overhead from fractionator 38 is compressed by compressor 50 and passed via line 51 into absorber 52 where it is contacted with a suitable absorber oil to wash out $C_4$ and higher hydrocarbons or at least to reduce the $C_4$ and higher hydrocarbon content of the hydrogen-rich gas to below 1 volume per cent. Absorber oil, which may be a gas oil or the like, is supplied to the absorber through line 53 and the absorber oil is circulated via pump 54 and line 55, with fat oil removed via line 56 to suitable equipment for stripping the absorbed hydrocarbons to render the oil suitable for recycling to the absorber.

In a typical installation absorber oil is supplied to absorber 52 at about 0.015 to 0.06 gal./s. c. f. of recycle gas. The absorber is operated at about 250 pounds per square inch and at temperatures of from about 60°–100° F The scrubbed recycle gas may desirably be freed of any entrained absorber oil in suitable centrifugal separators or filter means and is then suitable for passage to the regenerator or reactivator vessel or to the main reaction zone after preheating to the desired temperature. The fat oil is removed from the absorber 52 passed through a pressure relief valve or the like to reduce the pressure thereof to about atmospheric pressure whereupon the fat oil is heated by indirect heat exchange with 100 pound steam and passed into a stripper vessel where it is contacted with stripping steam (about 0.18 pound of steam per gallon of absorber oil). The steam stripped absorber oil is removed from the steam stripper at about 240° F. and is passed through a further heat exchanger and thence into a second desorption stage where it is contacted with a dry, inert stripping gas such as nitrogen supplied at a rate of about 3-4 s. c. f./gal. of absorber oil. The stripped absorber oil is withdrawn from the second stripping or desorption stage at about 260° F., make up oil is added and the oil is then recycled to the absorber after cooling to about 95° F. or below.

Hydrogen-rich recycle gas substantially free or containing less than 1 volume per cent of $C_4$ and higher hydrocarbons is removed from absorber 52 via line 58 and passed through heating coil 59 in furnace 47 where it is heated to temperatures of about 800° to 1200° F. and passed via line 60 into inlet line 19 where it picks up spent catalyst and conveys it through transfer line 18 into reactivation vessel 20.

The heating of the recycle gas in furnace 47 for use in the reactivation step should be carried to a temperature slightly higher than the reactor temperature. Thus the temperature in dense bed 21 in the reactivation vessel 20 is the same or slightly higher than that in the dense bed 11 in the reactor 10. The relative amounts of catalyst in beds 21 and 11 may vary from one to 10 times with bed 21 holding the most catalyst. For example, the catalyst may remain in bed 11 for about 1 hour and in bed 21 for about 3 hours.

Reactivated catalyst is withdrawn from vessel 20 and recycled to the hydroforming reactor vessel 10 as described above. The reactivation gases are removed overhead from vessel 20 through one or more cyclone separators 61 or the like and then passed via line 62, compressor 63 and line 64 back to inlet line 19 for recycling to the reactivation vessel 20. Some of the reactivation gases may be discharged from line 64 into inlet line 29 through valve controlled line 65 for passage through hydroforming reaction zone in admixture with recycle gas supplied through line 48.

The method of operation of this reactor system is as follows. A naphtha feed, preferably a virgin naphtha having a boiling range of about 200°–360° F. and a research octane number (clear) of about 45, is heated to about 1000° F. and supplied to the reactor vessel 10 which is charged with a catalyst prepared as described above and containing 0.5 weight per cent of platinum on activated alumina having a 1.0 weight per cent HF treat. The temperature of the dense reactor bed 11 is about 900° F. and the pressure about 215 pounds per square inch. Reactivated catalyst discharged from standpipe 25 is supplied to the reactor in admixture with recycle gas at about 1150°–1200° F. The catalyst to oil ratio by weight is about 1–3 but may be within the range of 15 to 0.1. The space velocity in the hydroforming section or w./hr./w. is about 2 but may be within the range of about 0.2 and 5. Hydrogen-rich recycle gas is supplied to the reactor vessel at a rate of about 2000–10,000 cubic feet preferably about 6000 cubic feet per barrel of liquid naphtha.

Some coke or carbonaceous material is deposited on the catalyst particles and accordingly catalyst particles are withdrawn from dense bed 11 for reactivation. The amount of coke or carbonaceous material on the catalyst is about 1.5 weight per cent but may be in the range of 0.5 to 5 weight per cent of the catalyst. Recycle gas containing less than 1 volume per cent of $C_4$ and higher hydrocarbons obtained for example by contacting gaseous materials separated from the hydroformate with an absorber oil at 100 to 500 pounds per square inch, at about 50° to 100° F. is heated to about 1000°–1400° F. is supplied to the reactivation zone to contact the catalyst particles containing carbonaceous deposits and remove carbonaceous deposits therefrom. While in some cases substantially complete removal of carbonaceous deposits may be desired, reduction of the carbon on catalyst by about 0.1 to about 0.5 weight per cent generally about 0.3 weight per cent is sufficient to maintain catalyst activity. The rate of circulation of the catalyst is ordinarily such that the catalyst is retained in the reactivation zone from one to ten times as long as in the hydroforming reaction zone. After reactivation the catalyst is again recycled to the hydroforming reaction zone.

A comparison of the results obtained when reactivating a platinum-containing catalyst with pure hydrogen (which would not be commercially feasible), ordinary recycle gas and a recycle gas free from $C_4$ and higher hydrocarbons is set out in the table below:

Catalyst: 0.5% Pt on 1% HF treated F-10 alumina.
Operating conditions: 200 p. s. i. g., 900° F., ⅓ hour reaction/regeneration cycle with 6 MSCF/barrel gas rate throughout, 200/330° FVT Texas Virgin Naphtha.

| Regeneration Gas | Once-through Hydrogen | Recycle Gas | | |
|---|---|---|---|---|
| | | $H_2$–$C_3$ [1]+1.5–2.0 vol. percent $C_4$+ | | $H_2$–$C_3$ [1] |
| Space Velocity, 2./hr./w. | 1 | 2 | 1 | 2 | 1 |
| Hours on Feed with Indicated Gas | 50 | 52 | 35 | 33 | 45 |
| CFR-R Octane Number: | | | | | |
| Start | 95.5 | 95.0 | 95.5 | 95.0 | 95.5 |
| Finish | 95.5 | 95.0 | 69.0 | 90.5 | 97.5 |

[1] 92% $H_2$, 2.5% $C_1$, 4.0% $C_2$, 1.5% $C_3$.

It should be noted that while activity is maintained with once-through hydrogen (other runs have indicated over 300 hours without loss of activity), use of recycle gas containing small amounts of heavy ends causes a rapid decline in activity after 30–35 hours on feed. However, a recycle gas which contained only $H_2$–$C_3$ not only maintained activity over a similar period, but also appears to have actually increased it somewhat (97.5 vs. 95.5 O.N.). This shows that $C_4$ and heavier should be considerably reduced or excluded from the recycle gas used in regenerating platinum on alumina catalysts in order to maintain their activity.

The foregoing description contains a limited number of embodiments of the present invention. It will be understood that numerous variations are possible without departing from the scope of the invention as defined in the following claims.

What is claimed is:

1. In a hydroforming process with a platinum-containing catalyst wherein the pressure is maintained below about 500 pounds per square inch and a temperature below about 975° F., the improved method of maintaining a continuous process which comprises passing hydrocarbon vapors and hydrogen-containing gas through a bed of finely divided platinum-containing alumina particles at a pressure such that coke or carbonaceous material is deposited on the catalyst particles, then treating the catalyst particles containing coke or carbonaceous materials deposited thereon with a hydrogen-rich recycle gas which is substantially free of $C_4$ and higher hydrocarbon at substantially the hydroforming pressure and temperature for a time sufficient to remove coke or carbonaceous material from the catalyst particles and thereby reactivate the catalyst and then passing hydrocarbon vapors and hydrogen-containing gas over the reactivated catalyst particles under hydroforming conditions.

2. In a hydroforming process in the presence of a platinum-containing catalyst wherein the pressure is maintained at about 50 to 250 pounds per square inch and a temperature between about 800° F. and 975° F., the improved method of maintaining a continuous process of hydroforming which comprises passing hydrocarbon vapors and hydrogen-containing gas through a fluid bed of finely divided platinum-containing alumina particles at such a velocity to maintain a dense fluidized bed of catalyst particles while depositing coke or carbonaceous material on the catalyst particles and while maintaining a superatmospheric pressure, withdrawing catalys containing coke deposits from said first dense fluidized bed of catalyst and passing it to a second fluidized bed of catalyst, treating the withdrawn catalyst in said second dense fluidized bed with hydrogen-rich recycle gas which is substantially free of $C_4$ and higher hydrocarbons at substantially hydroforming pressure to remove coke or carbonaceous material from the catalyst particles and thereby reactivate the catalyst and then returning the reactivated catalyst particels from said second fluidized bed to said first fluidized bed.

3. A method according to claim 2 wherein the hydrogen-rich recycle gas used for reactivating the catalyst in said second dense fluidized bed is gas formed in the hydroforming process and before being passed to the second dense fluidized bed is passed through an absorber to reduce the $C_4$ and higher hydrocarbon content to below 1 volume per cent and is heated to a temperature higher than exists in the hydroforming step.

4. A method according to claim 3 wherein the recycle gas is heated to about 1000° to 1400° F. before being passed through said second fluidized bed and the reactivated catalyst passing to said first fluidized bed is at a temperature of about 1000–1200° F.

5. A method according to claim 4 wherein there is more catalyst in the second fluidized bed than in the first fluidized bed.

References Cited in the file of this patent

UNITED STATES PATENTS

| | | |
|---|---|---|
| 2,322,863 | Marshchner et al. | June 29, 1943 |
| 2,472,844 | Munday et al. | June 14, 1949 |
| 2,479,110 | Haensel | Aug. 16, 1949 |
| 2,606,878 | Haensel | Aug. 12, 1952 |
| 2,642,381 | Dickinson | June 16, 1953 |

FOREIGN PATENTS

| | | |
|---|---|---|
| 577,008 | Great Britain | May 1, 1946 |